(12) United States Patent
Baber et al.

(10) Patent No.: US 12,517,914 B2
(45) Date of Patent: Jan. 6, 2026

(54) SYSTEM AND METHOD FOR COMBINATORIAL DATA OUTLIER DETECTION VIA DATABASE QUERY STATEMENT GENERATION

(71) Applicant: BANK OF AMERICA CORPORATION, Charlotte, NC (US)

(72) Inventors: Matthew Grant Baber, Charlotte, NC (US); Dipesh Bhattarai, Oak Park, CA (US); Andreas Alexander Boeker, Harrisburg, NC (US); Abir Mustafa Chowdhury, New York, NY (US); Thomas Gorham, Boston, MA (US); Meghan Elise Johansson, Charlotte, NC (US); Kathryn Wyke Ruse, Charlotte, NC (US); Mary Ivette Reyes, Chicago, IL (US); Kenneth Anthony Smith, II, Austin, TX (US); Bryan Mitchell Wood, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/368,102

(22) Filed: Sep. 14, 2023

(65) Prior Publication Data

US 2025/0094433 A1     Mar. 20, 2025

(51) Int. Cl.
G06F 16/20      (2019.01)
G06F 16/22      (2019.01)
(Continued)

(52) U.S. Cl.
CPC ...... *G06F 16/2462* (2019.01); *G06F 16/2282* (2019.01); *G06F 16/242* (2019.01)

(58) Field of Classification Search
CPC . G06F 16/2462; G06F 16/242; G06F 16/2282
See application file for complete search history.

(56) References Cited

U.S. PATENT DOCUMENTS 5,412,804 A * 5/1995 Krishna ............ G06F 16/24544
7,085,757 B2 * 8/2006 Dettinger ............ G06F 16/2428
                                                          707/E17.135

(Continued)

FOREIGN PATENT DOCUMENTS

WO    WO2005008369 A1 *  1/2005
WO    WO2005008369 A2 *  1/2005

*Primary Examiner* — Daniel A Kuddus
(74) *Attorney, Agent, or Firm* — Moore & Van Allen PLLC; Andrew T. Wood

(57) ABSTRACT

Systems, computer program products, and methods are described herein for combinatorial data outlier detection via database query statement generation. A table comprising rows and columns is received, wherein each column comprises records and a corresponding data element. A datatype to be assigned to each data element is determined, based on each column and using a first machine learning model. Conditions are generated for columns corresponding to each data element. The conditions are combined into a predetermined number of condition combinations, wherein the condition combinations comprise combinatorial sequencing of the conditions. A query statement is generated for each of the condition combinations. The table in queried with each query statement to determine query results. A data element quantity and a record quantity in the query results are determined for each query statement.

20 Claims, 10 Drawing Sheets

(51) Int. Cl.
*G06F 16/242* (2019.01)
*G06F 16/2458* (2019.01)

(56) References Cited

U.S. PATENT DOCUMENTS

| | | | |
|---|---|---|---|
| 8,700,579 B2 * | 4/2014 | Apanowicz | H03M 7/30 |
| | | | 707/693 |
| 8,828,593 B2 * | 9/2014 | Kwak | H01M 10/058 |
| | | | 429/185 |
| 8,838,593 B2 * | 9/2014 | Apanowicz | H03M 7/30 |
| | | | 707/791 |
| 9,280,788 B2 | 3/2016 | Ferrari | |
| 9,787,705 B1 | 10/2017 | Love | |
| 10,289,720 B2 | 5/2019 | Ferrari | |
| 10,409,817 B1 | 9/2019 | Dias | |
| 10,929,421 B2 | 2/2021 | Rai | |
| 11,093,633 B2 | 8/2021 | Jacob | |
| 11,250,343 B2 | 2/2022 | Rai | |
| 11,341,513 B2 | 5/2022 | Jackson | |
| 11,468,098 B2 | 10/2022 | Chan | |
| 11,734,564 B2 | 8/2023 | Jacob | |
| 11,881,287 B2 * | 1/2024 | Gardner | G06N 5/045 |
| 11,941,140 B2 | 3/2024 | Jacob | |
| 2005/0010557 A1 * | 1/2005 | Dettinger | G06F 16/903 |
| | | | 707/E17.135 |
| 2005/0240614 A1 * | 10/2005 | Barsness | G06F 16/2462 |
| | | | 707/999.102 |
| 2006/0114574 A1 * | 6/2006 | Sekita | G02B 15/177 |
| | | | 359/689 |
| 2006/0224574 A1 * | 10/2006 | Dettinger | G06F 16/903 |
| | | | 707/E17.135 |
| 2008/0071818 A1 * | 3/2008 | Apanowicz | H03M 7/30 |
| 2008/0275855 A1 * | 11/2008 | Wason | G06F 16/2438 |
| 2015/0006508 A1 * | 1/2015 | Slezak | G06F 16/1744 |
| | | | 707/718 |
| 2016/0019339 A1 * | 1/2016 | Sazonov | G16B 30/00 |
| | | | 702/20 |
| 2018/0357595 A1 | 12/2018 | Rai | |
| 2021/0373990 A1 | 12/2021 | Saxena | |
| 2022/0044133 A1 | 2/2022 | Otto | |
| 2022/0138592 A1 * | 5/2022 | Horesh | G06N 20/00 |
| | | | 706/46 |
| 2023/0135157 A1 * | 5/2023 | Badawy | H04L 63/102 |
| | | | 726/28 |

* cited by examiner

| | Numeric Data Types | Date Data Types | Text Data Types |
|---|---|---|---|
| Null Conditions All data elements will have a condition that checks if it is Null or not Null. | Number is not Null<br>Number is Null | Date is not Null<br>Date is Null | Text is not Null<br>Text is Null |
| Operator Conditions Compares dates to other dates in the table. Compares numbers to other numbers in the table. | Number 1 >= Number 2<br>Number 1 > Number 2<br>Number 1 == Number 2<br>Number 1 <> Number 2<br>Number 1 <= Number 2<br>Number 1 < Number 2 | Date 1 >= Date 2<br>Date 1 > Date 2<br>Date 1 == Date 2<br>Date 1 <> Date 2<br>Date 1 <= Date 2<br>Date 1 < Date 2 | N/A |
| Possible Value Conditions Compares the data element's value to a list of possible values. Best used for data elements with a pre-defined set of values the data element can take. | Number == Possible Value<br>Number <> Possible Value | Date == Possible Value<br>Date <> Possible Value | Text == Possible Value<br>Text <> Possible Value |

FIG. 4

Input:
Lower % Limit: 0
Upper % Limit: 1.00

| Query Statement | # of Suspects Returned | % of Records Returned |
|---|---|---|
| SELECT 97 AS RULE_ID, hi_qual_lqd_ast_dt FROM DQ_sample WHERE (hi_qual_lqd_ast_dt IS NOT NULL OR hi_qual_lqd_ast_dt NOT IN ('')) | 16 | 4.24e-05 |
| SELECT 321 AS RULE_ID, clsr_rsn_ctgy_code FROM DQ_sample WHERE (TRIM(clsr_rsn_ctgy_code) IS NOT NULL OR TRIM(clsr_rsn_ctgy_code) NOT IN ('') OR clsr_rsn_ctgy_code != 'nan') | 300,102 | 0.79 |
| SELECT 581 AS RULE_ID, prmy_ctrl_code, cr_src_sys_code FROM DQ_sample WHERE ((TRIM(prmy_ctrl_code) IS NULL OR TRIM(prmy_ctrl_code) IN ('') OR prmy_ctrl_code= 'nan') AND (TRIM(cr_src_sys_code) IS NULL OR TRIM(cr_src_sys_code) IN ('') OR cr_src_sys_code= 'nan')) | 868 | 0.0023 |
| SELECT 711 AS RULE_ID, fac_obln_dist_id, tot_fee_ern_itd_natv_amt FROM DQ_sample WHERE (fac_obln_dist_id >= tot_fee_ern_itd_natv_amt) | 94,213 | 0.25 |
| SELECT 808 AS RULE_ID, utlz_natv_amt, tot_fronted_rsk_natv_amt FROM DQ_SAMPLE WHERE (utlz_natv_amt >= tot_fronted_rsk_natv_amt) | 260,963 | 0.69 |
| SELECT 1015 AS RULE_ID, regulator_rsk_typ_code, as_of_dt, renw_efect_dt FROM DQ_sample WHERE ((TRIM(regulator_rsk_typ_code) IS NULL OR TRIM(regulator_rsk_typ_code) IN ('') OR regulator_rsk_typ_code= 'nan') AND (as_of_dt = renw_efect_dt)) | 74 | 0.0002 |

FIG. 6

SYSTEM AND METHOD FOR COMBINATORIAL DATA OUTLIER DETECTION VIA DATABASE QUERY STATEMENT GENERATION

FIELD OF THE INVENTION

The present invention embraces a system for combinatorial data outlier detection via database query statement generation.

BACKGROUND

In the realm of data quality analysis, Data Quality analysts and quality assurance teams are presented with a complex challenge centered around rule management. This challenge involves the oversight of a myriad of rules, initially based on specific Physical Data Elements (PDEs), and a recurring need to introduce new rules periodically to ensure the quality of data. In some applications, these rules identify disparities between the content of documents and the structured data recorded within the Systems of Record (SORs). However, the process of rule generation and validation remains laborious, requiring Subject Matter Experts (SMEs) to dedicate lengthy hours and manual reviews of the rules to ascertain the validity of each potential new rule. The end-to-end journey of crafting these rules from inception to deployment is lengthy. This time-consuming process inhibits the efficiency required to adapt to changing data landscapes. Accordingly, there is a need for a system and method for combinatorial data outlier detection via database query statement generation.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for combinatorial data outlier detection via database query statement generation is presented. The system may include a processing device, and a non-transitory storage device including instructions that, when executed by the processing device, causes the processing device to perform the steps of: receiving a table including rows and columns, wherein each column includes records and a corresponding data element, determine, based on each column and using a first machine learning model, a datatype to be assigned to each data element, wherein the datatype is selected from a list consisting of numeric, date, and text, generate conditions for columns corresponding to each data element, wherein conditions are selected based on the datatype, and wherein conditions are selected from a group consisting of null conditions, operator conditions, and possible value conditions, combining the conditions into a predetermined number of condition combinations, wherein the condition combinations comprise combinatorial sequencing of the conditions, generating a query statement for each of the condition combinations, querying the table with each query statement to determine query results, wherein the query results match at least one of the condition combinations, and determining, for each query statement, a data element quantity in the query results and a record quantity corresponding to each data element in the query results.

In some embodiments, the instructions further cause the processing device to perform the steps of tag the querying statement as a potential rule in response to the data element quantity in the query results being within a first predetermined upper and lower limit, and the record quantity corresponding to each data element in the query results being within a second predetermined upper and lower limit, applying an outlier detection model to the records corresponding to the potential rule, and identifying, using the outlier detection model, outliers in the records, wherein the outliers are detected based on proximity to clusters generated by the outlier detection model.

In some embodiments, the instructions further cause the processing device to perform the steps of generating a plot including a graph network of the records corresponding to the potential rule, and transmitting the plot to an endpoint device for displaying on an interface of the endpoint device.

In some embodiments, the instructions further cause the processing device to perform the steps of generating a plot including a graph network of the records corresponding to the outliers in the records, and transmitting the plot to an endpoint device for displaying on an interface of the endpoint device.

In some embodiments, the instructions further cause the processing device to perform the steps of applying a grid search technique including hyperparameter tuning to the outlier detection model.

In some embodiments, the outlier detection model includes at least one selected from the group consisting of: a local outlier factor method and an isolation forest method.

In some embodiments, the outlier detection model includes a local outlier factor method and an isolation forest method.

In another aspect, a computer program product for combinatorial data outlier detection via database query statement generation is presented. The computer program product may include a non-transitory computer-readable medium including code causing an apparatus to receive a table including rows and columns, wherein each column includes records and a corresponding data element, determine, based on each column and using a first machine learning model, a datatype to be assigned to each data element, wherein the datatype is selected from a list consisting of numeric, date, and text, generate conditions for columns corresponding to each data element, wherein conditions are selected based on the datatype, and wherein conditions are selected from a group consisting of null conditions, operator conditions, and possible value conditions, combine the conditions into a predetermined number of condition combinations, wherein the condition combinations comprise combinatorial sequencing of the conditions, generate a query statement for each of the condition combinations, query the table with each query statement to determine query results, wherein the query results match at least one of the condition combinations, and determine, for each query statement, a data element quantity in the query results and a record quantity corresponding to each data element in the query results.

In some embodiments, the code further causes the apparatus to tag the query statement as a potential rule in response to the data element quantity in the query results being within a first predetermined upper and lower limit, and the record quantity corresponding to each data element in the query results being within a second predetermined upper and lower limit, apply an outlier detection model to the records corresponding to the potential rule, and identify, using the outlier detection model, outliers in the records, wherein the outliers are detected based on proximity to clusters generated by the outlier detection model.

In some embodiments, the code further causes the apparatus to generate a plot including a graph network of the records corresponding to the potential rule, and transmit the plot to an endpoint device for displaying on an interface of the endpoint device.

In some embodiments, the code further causes the apparatus to generate a plot including a graph network of the records corresponding to the outliers in the records, and transmit the plot to an endpoint device for displaying on an interface of the endpoint device.

In some embodiments, the code further causes the apparatus to apply a grid search technique including hyperparameter tuning to the outlier detection model.

In some embodiments, the outlier detection model includes at least one selected from the group consisting of: a local outlier factor method and an isolation forest method.

In some embodiments, the outlier detection model includes a local outlier factor method and an isolation forest method.

In yet another aspect, a method for combinatorial data outlier detection via database query statement generation is presented. The method may include receiving a table including rows and columns, wherein each column includes records and a corresponding data element, determining, based on each column and using a first machine learning model, a datatype to be assigned to each data element, wherein the datatype is selected from a list consisting of numeric, date, and text, generating conditions for columns corresponding to each data element, wherein conditions are selected based on the datatype, and wherein conditions are selected from a group consisting of null conditions, operator conditions, and possible value conditions, combining the conditions into a predetermined number of condition combinations, wherein the condition combinations comprise combinatorial sequencing of the conditions, generating a query statement for each of the condition combinations, querying the table with each query statement to determine query results, wherein the query results match at least one of the condition combinations, and determining, for each query statement, a data element quantity in the query results and a record quantity corresponding to each data element in the query results.

In some embodiments, the method further may include tagging the query statement as a potential rule in response to the data element quantity in the query results being within a first predetermined upper and lower limit, and the record quantity corresponding to each data element in the query results being within a second predetermined upper and lower limit, applying an outlier detection model to the records corresponding to the potential rule, and identifying, using the outlier detection model, outliers in the records, wherein the outliers are detected based on proximity to clusters generated by the outlier detection model.

In some embodiments, the method further may include generating a plot including a graph network of the records corresponding to the potential rule, and transmitting the plot to an endpoint device for displaying on an interface of the endpoint device.

In some embodiments, the method further may include applying a grid search technique including hyperparameter tuning to the outlier detection model.

In some embodiments, the outlier detection model includes at least one selected from the group consisting of: a local outlier factor method and an isolation forest method.

In some embodiments, the outlier detection model includes a local outlier factor method and an isolation forest method.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
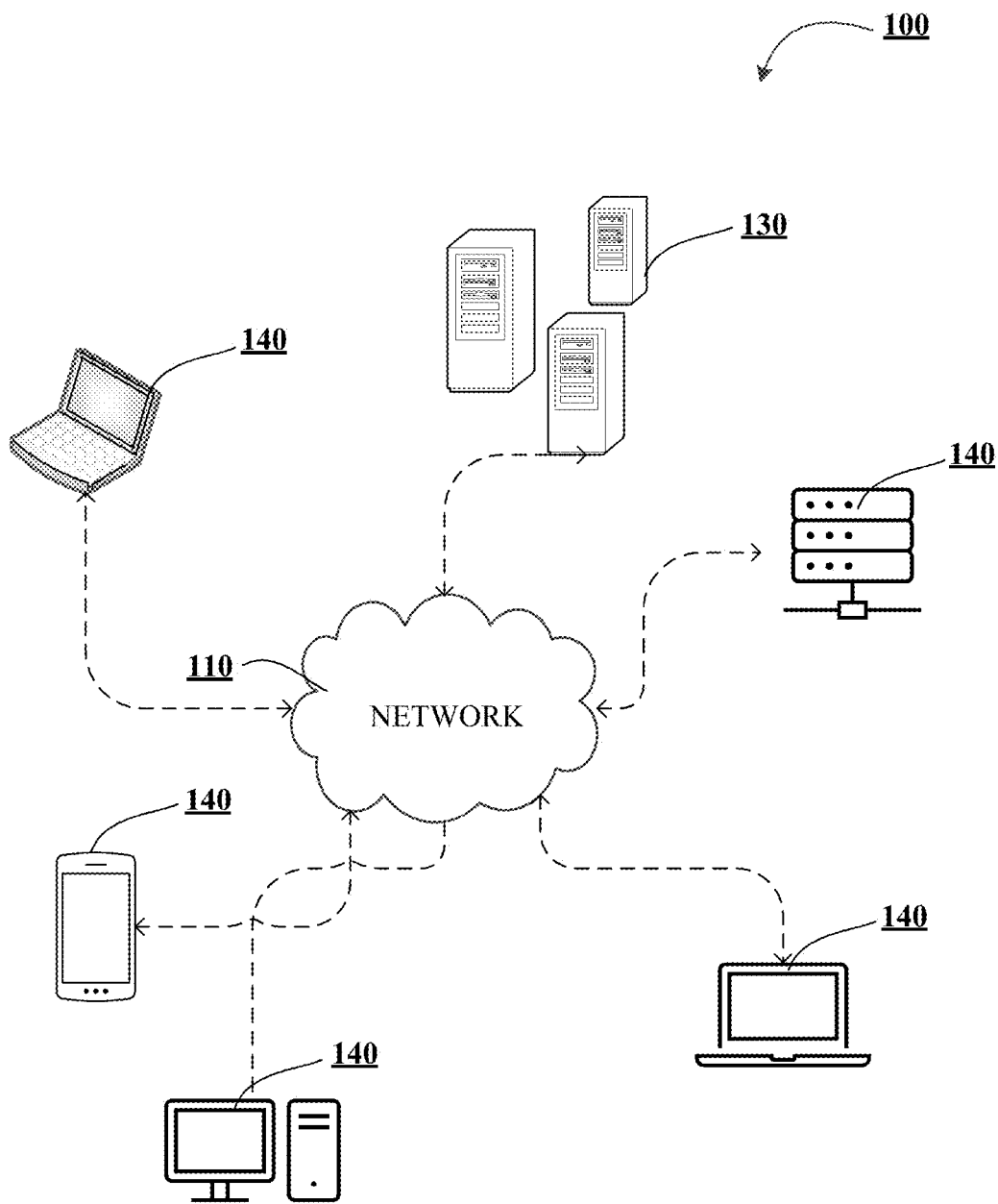
Figure 1B:
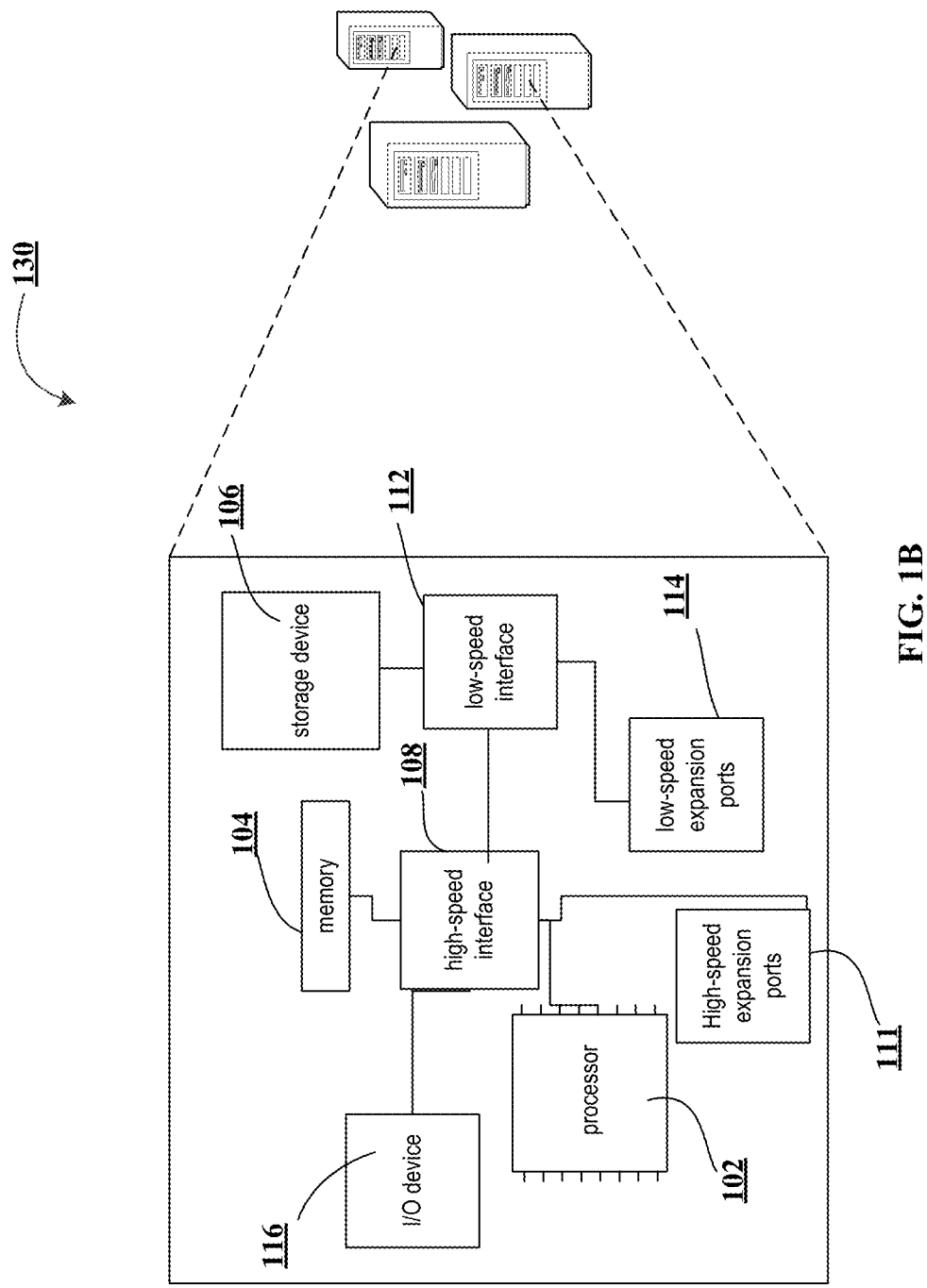
Figure 1C:
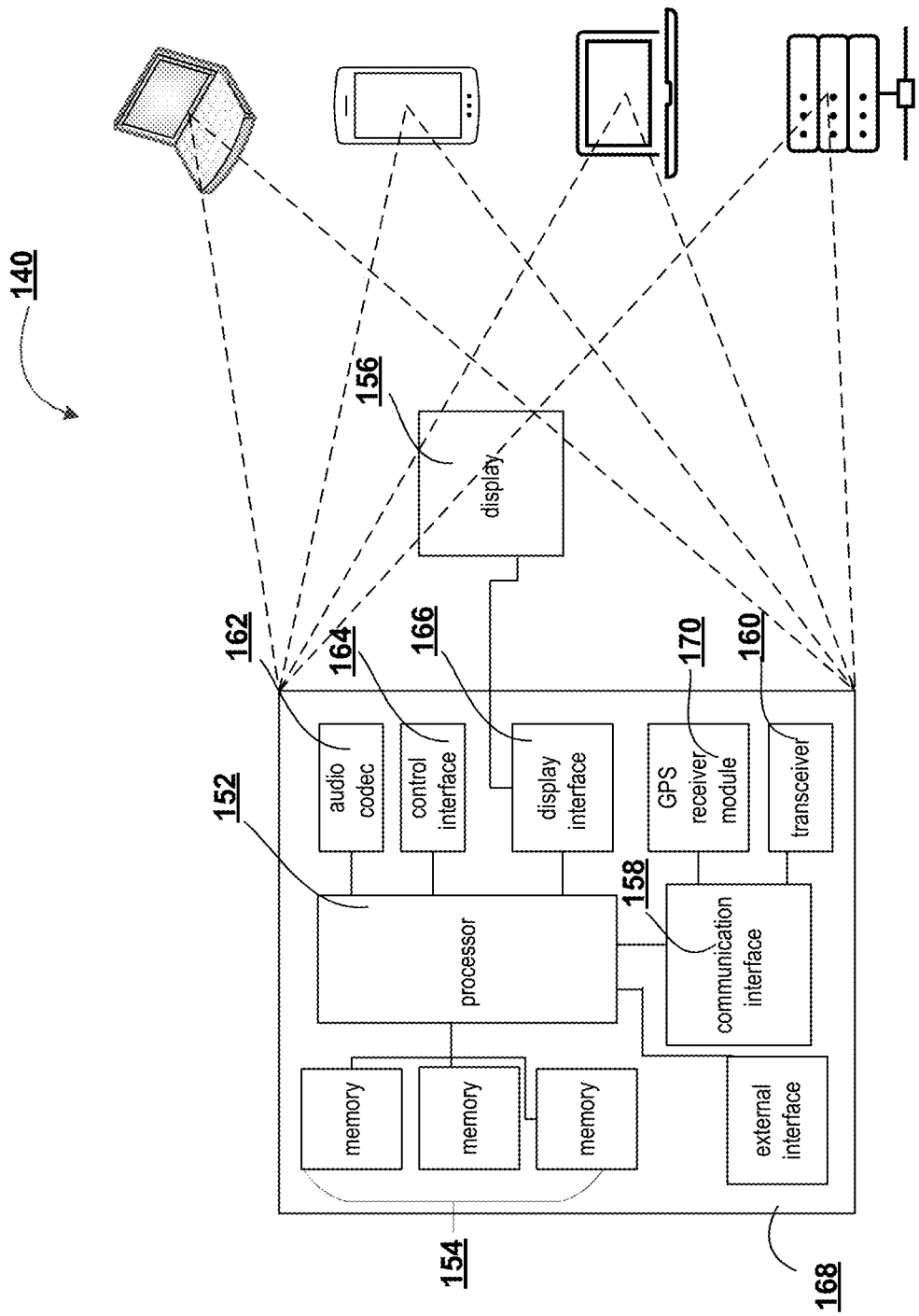
Figure 2:
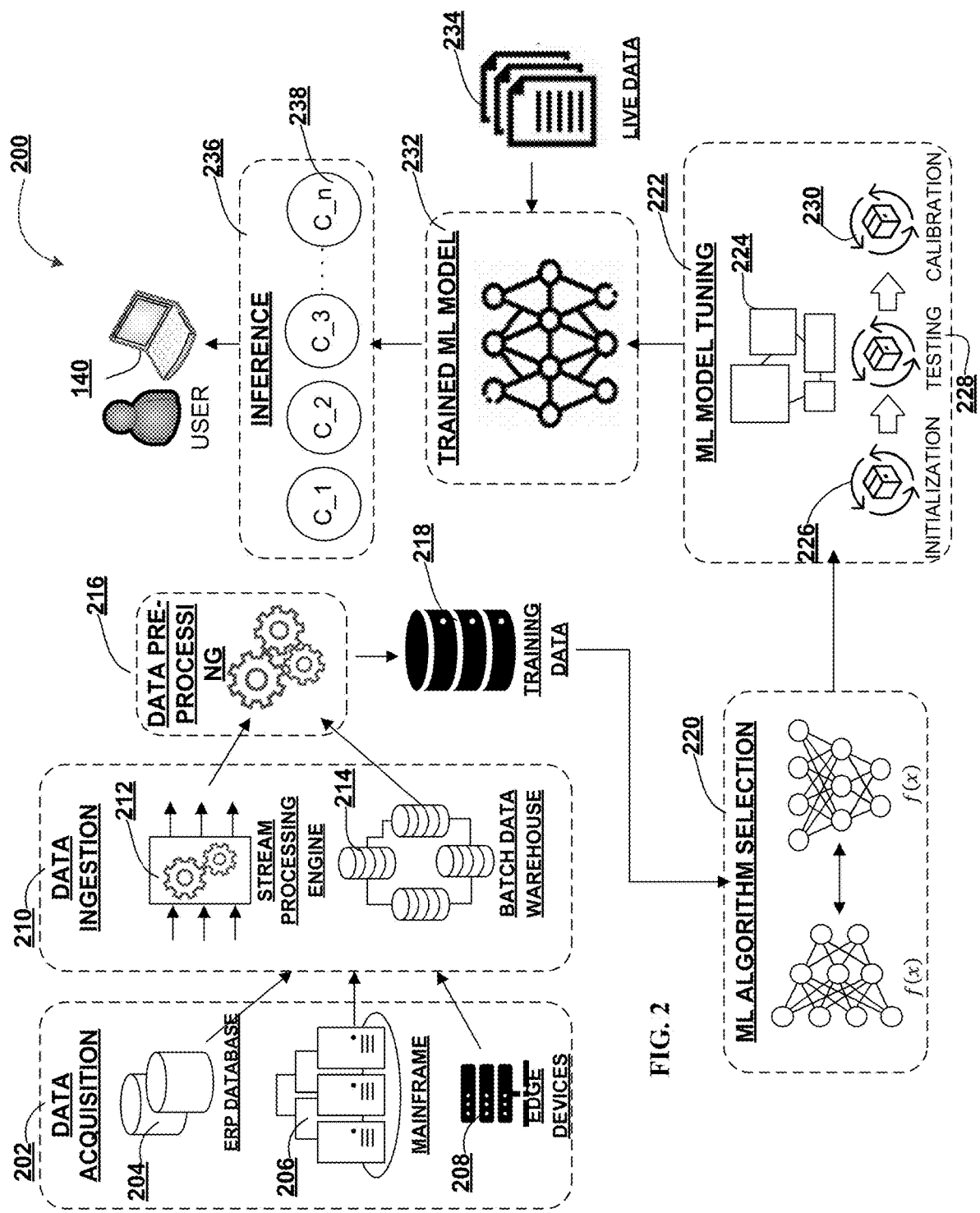
Figure 3A:
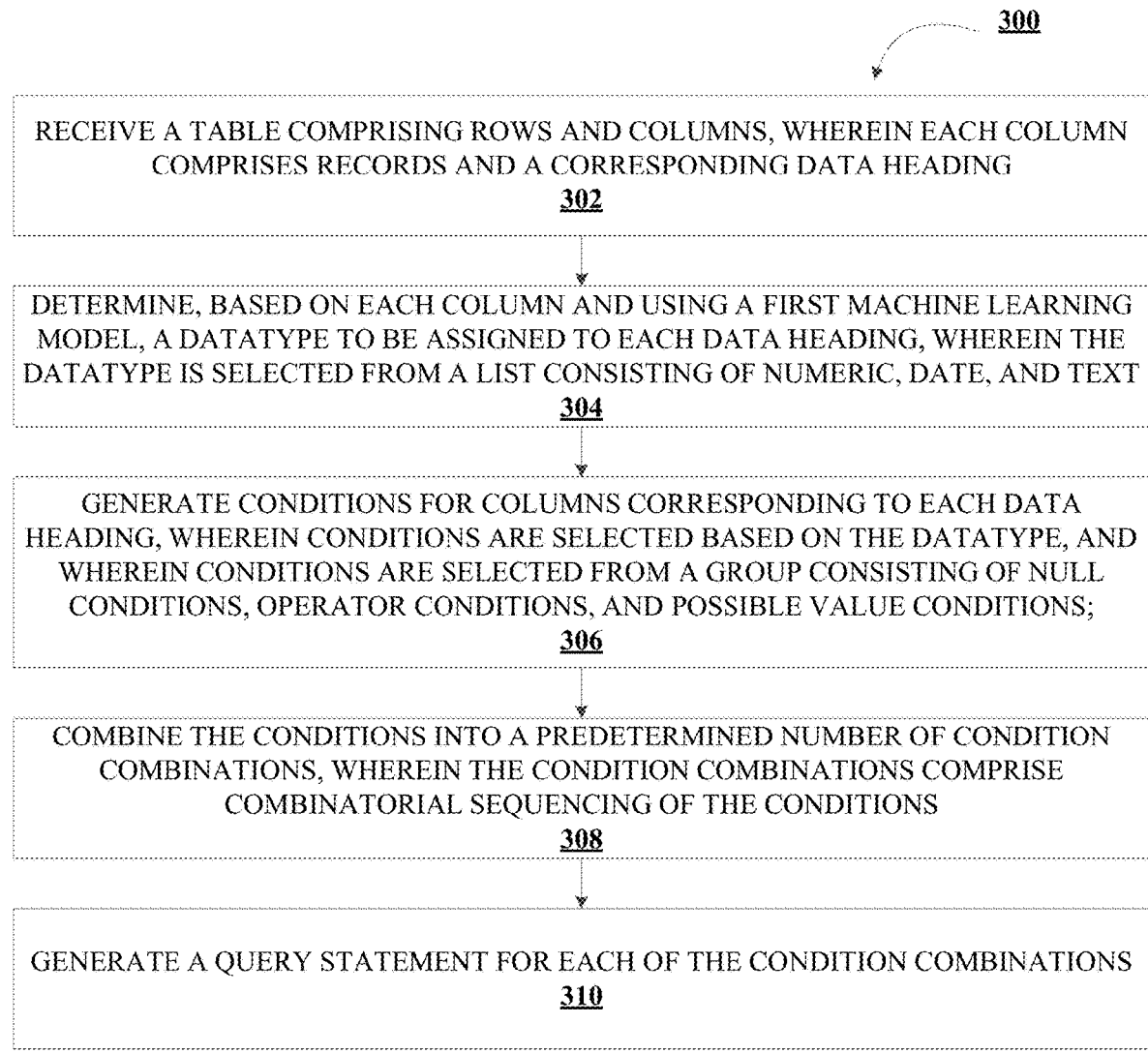
Figure 3B:
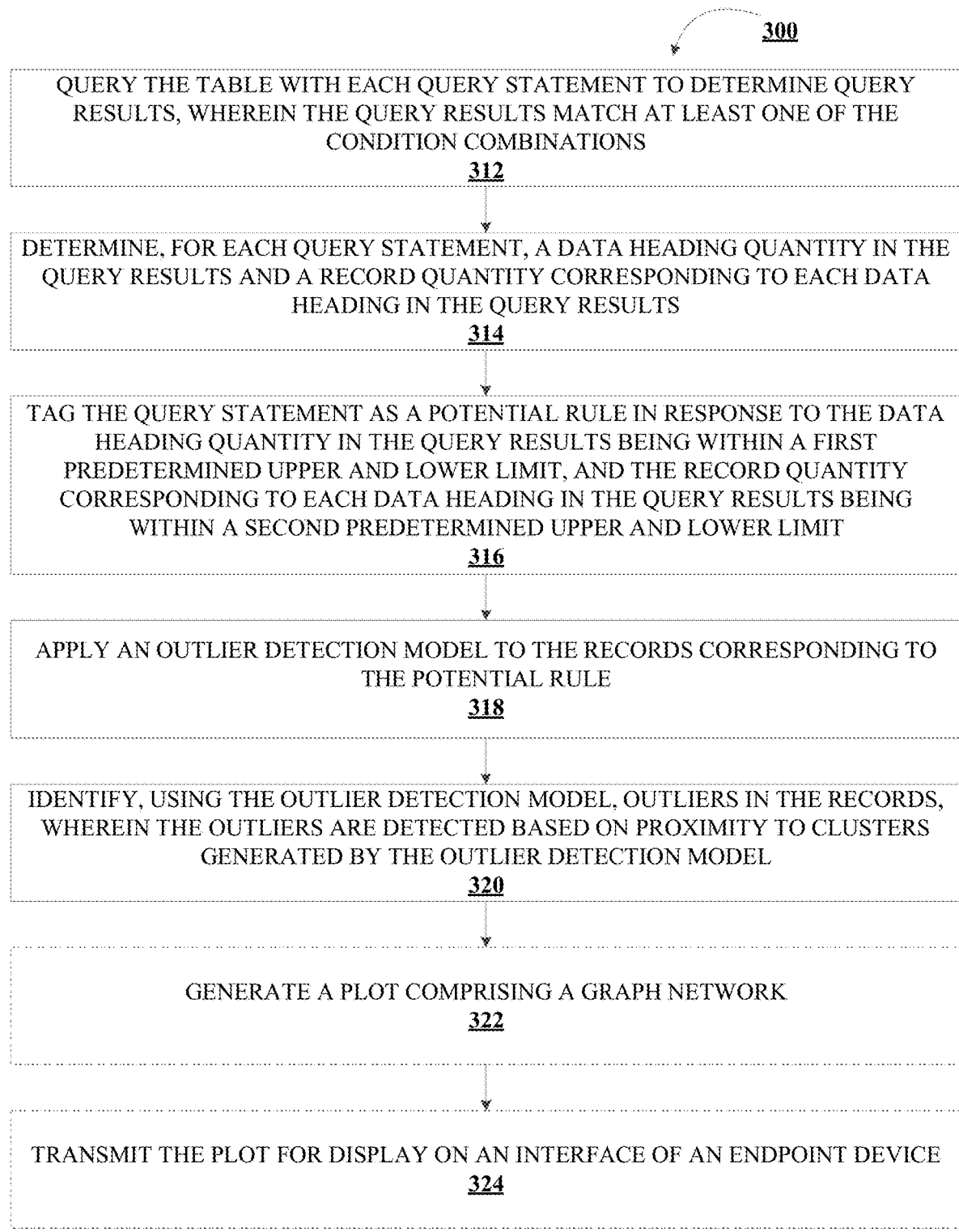
Figure 5:
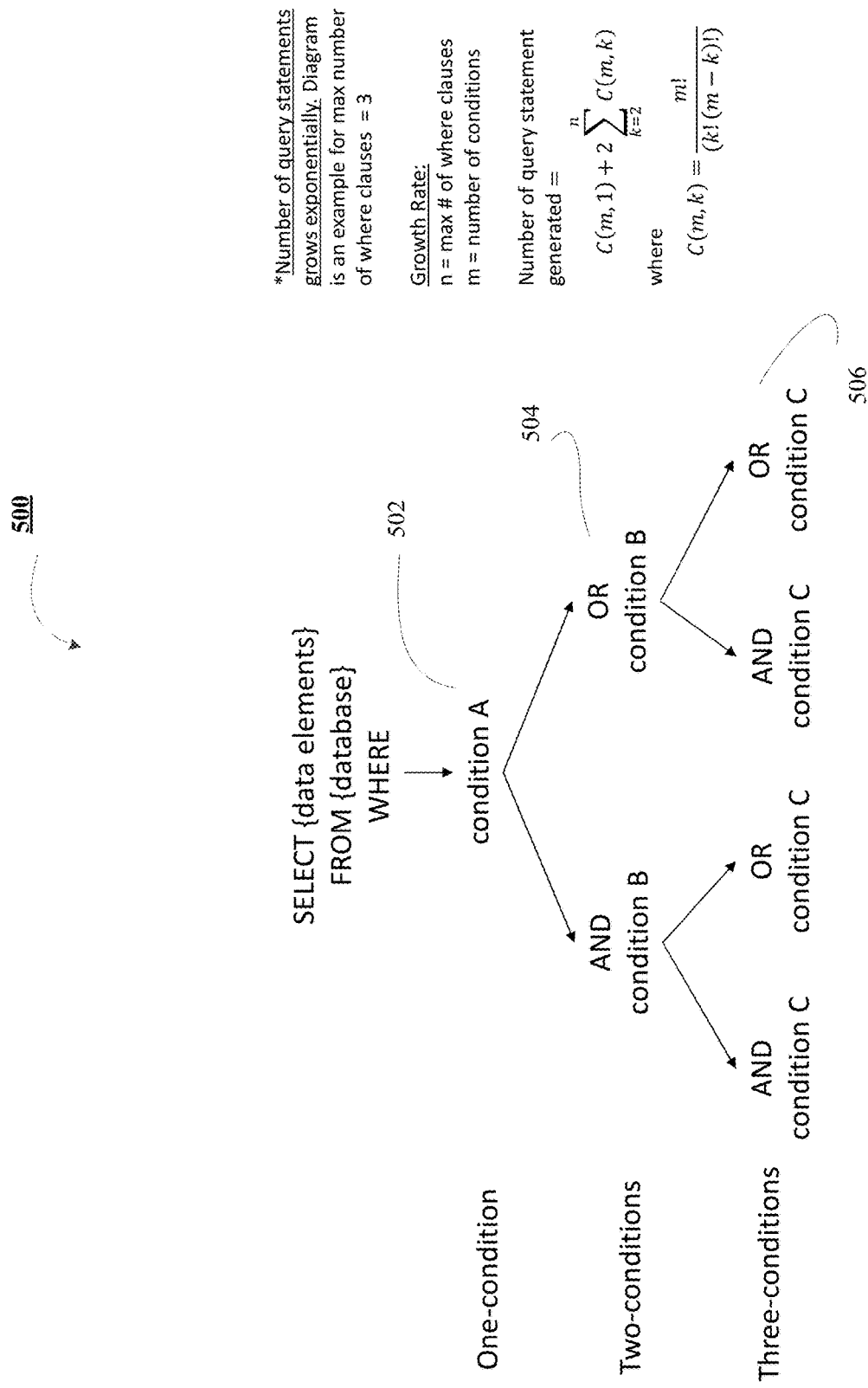
Figure 7:
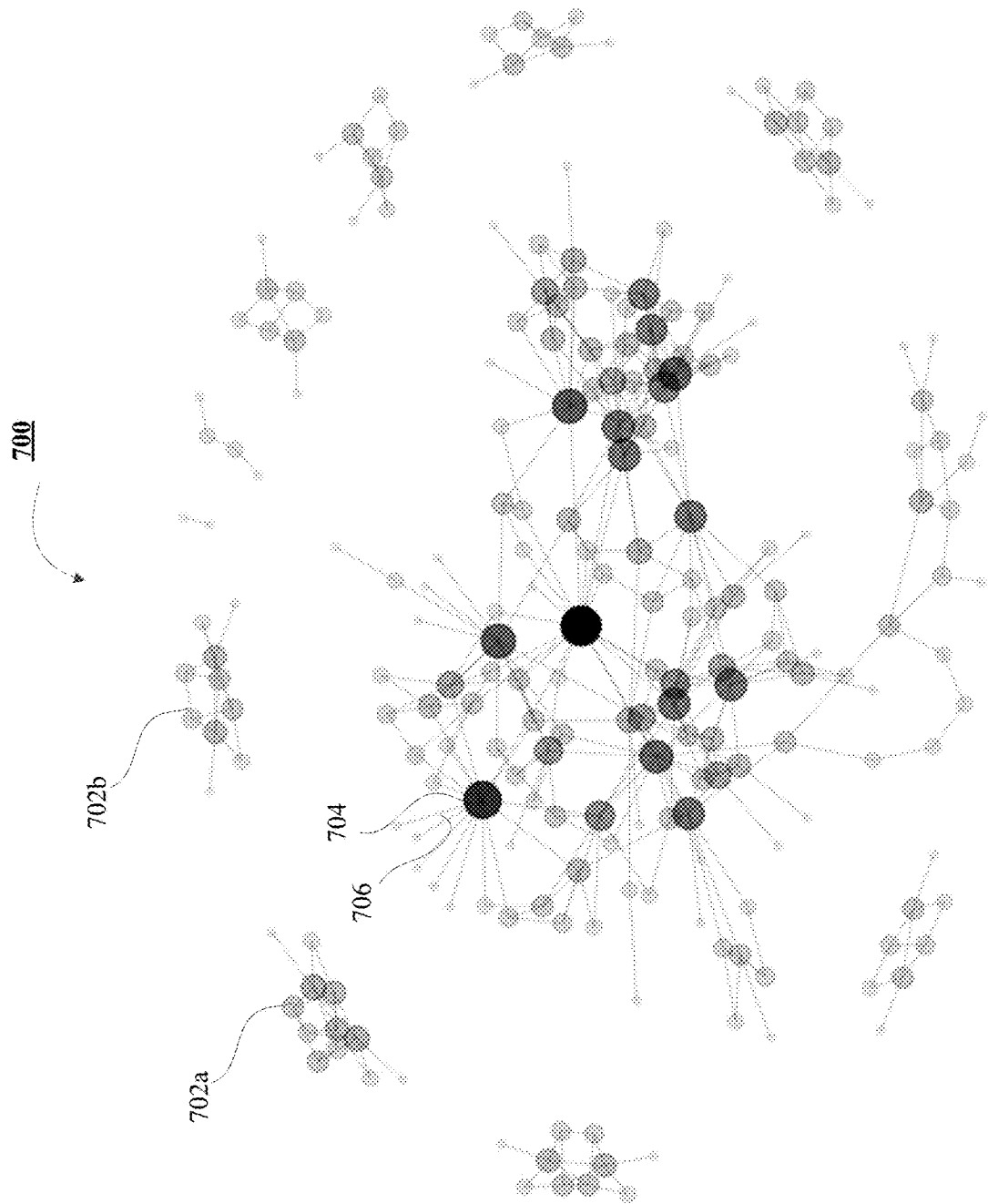

Having thus described embodiments of the invention in general terms, reference will now be made the accompanying drawings, wherein:

FIGS. 1A-1C illustrate technical components of an exemplary distributed computing environment for combinatorial data outlier detection via database query statement generation, in accordance with an embodiment of the invention;

FIG. 2 illustrates an exemplary machine learning model architecture, in accordance with an embodiment of the invention;

FIGS. 3A-3B illustrate a process flow for combinatorial data outlier detection via database query statement generation, in accordance with an embodiment of the invention;

FIG. 4 illustrates a condition chart for use in determining conditions, in accordance with an embodiment of the invention;

FIG. 5 illustrates the determination of condition combinations, in accordance with an embodiment of the invention;

FIG. 6 illustrates an exemplary querying with query statements to determine query results, in accordance with an embodiment of the invention; and FIG. 7 illustrates an exemplary graph network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "interface" may be any device or software that allows a user to input information, such as commands or data, into a device, or that allows the device to output information to the user. For example, the interface includes a graphical user interface (GUI) or an interface to input computer-executable instructions that direct a processing device to carry out specific functions. The interface typically employs certain input and output devices to input data received from a user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

As used herein, a "quantum computer" may refer to any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Quantum computing involves theoretical computation systems that make direct use of quantum-mechanical phenomena, such as superposition and entanglement, to perform operations on data. Whereas common digital computing, otherwise referred to herein as classical computing, requires that the data be encoded into binary digits (i.e., bits), each of which is always in one of two definite states (0 or 1), quantum computation encode data onto quantum bits, referred to herein as qubits, which can be in superpositions of states. Unlike conventional bits, however, qubits exhibit quantum behavior, allowing the quantum computer to process a vast number of calculations simultaneously. A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three-qubit system can store the information of eight classical bits, four qubits can store the information of sixteen classical bits, and so on. A quantum computer with three hundred qubits could possess the processing power equivalent to the number of atoms in the known universe.

In this regard, quantum computing allows for a more robust computing environment, in which much larger volumes of data can be processed in much shorter periods of time than would otherwise be realized by a classical computer apparatus.

A "quantum algorithm" as used herein may refer to an algorithm comprising a model for quantum computation. Examples of quantum algorithms may include quantum simulation algorithms (such as Quantum Phase Estimation and Variational Quantum Eigensolver) quantum search algorithms (such as Grover's Algorithm) factoring algorithms (such as Shor's Algorithm), machine learning algorithms (such as Quantum Support Vector Machine and Quantum Neural Networks), and quantum optimization algorithms (such as the Quantum Approximate Optimization Algorithm).

Before the invention described herein, the state of technology in addressing the rule creation process to efficiently identify discrepancies in the Systems of Record was practically non-existent. Existing systems relied almost entirely on human testing and quality control mechanisms to painstakingly generate new rules, apply them, and later make a decision as to the effectiveness of said rules. Any attempts to automate this process have been suboptimal in performance, as there was no clear way to both generate a large number of potential rules, while also efficiently evaluating the large number of rules for their validities and efficacies. Moreover, the existing rule generation and validity testing solutions lacked automation, requiring manual interaction with the rules in order to create and evaluate said rules.

The problem at hand necessitates finding a solution to address the gaps in the rule generation and analysis process. These gaps primarily arise from the manual intervention currently required for developing optimal rules to test the quality of data. Even if a large set of rules could be generated, there exists no current system or method for how to efficiently reduce the large set into a set of rules that is reasonable in size and scope for application to the data in a database. Moreover, the labor-intensive rule generation and testing process poses additional challenges related to typographical errors, misapplication of rules into the incorrect data, and so forth. Therefore, there is an immediate need for an innovative solution that can streamline and automate the rule generation and selection process while addressing the manual efforts involved in the current data quality rule landscape.

The present disclosure reflects the discovery of a novel solution that uses a specific method for generating a large volume of query statements, where the query statements are then applied to a table of a database to determine if the query statements that were generated are candidates for outlier detection. This technology enables query statements to be generated, selectively and methodically, based on the type of data within any given column of a database. By applying a machine learning algorithm to determine the type of data within a column, this system can automatically optimize the selection of conditions used to formulate the query statements. By applying machine learning-based outlier detection model algorithms, it becomes possible to identify and flag data points or instances that deviate significantly from the expected patterns within a given dataset. This enables entities to proactively detect anomalies, unusual behaviors, or potential errors that might otherwise go unnoticed, leading to improved data quality, more accurate insights, and enhanced decision-making processes. Moreover, the system enables visualization of anomalies as a graph network, which provides a comprehensive and intuitive way to explore the relationships between these outliers and the rest of the data points. This visualization approach aids in uncovering hidden connections, understanding the potential impact of anomalies on various data clusters, and facilitating the identification of underlying trends or patterns that might contribute to the occurrence of these anomalies. As a result, stakeholders can gain deeper insights into the complex interplay of data factors.

Specifically, the present disclosure introduces a system, computer program product, and method for combinatorial data outlier detection via database query statement generation. The process begins with a table being received from a database. A machine learning model is then used to determine a datatype to be assigned to each data element of the table. These could be numeric, date, or text. Conditions for columns are then generated, with such columns being related to a data element at every column. The conditions generated are generally selected as a result of the type of data (the "datatype") within the column. Depending on the datatype, conditions are selected from various types, such as null conditions, operator conditions, and possible value conditions. In order to create query statements, the conditions are combined in a rigid, brute force combinatorial sequencing manner, generating up to a predetermined number of condition combinations. Next, as a result of the condition combinations, query statements (such as SQL statements) are generated that reflect the condition combinations. Some query statements will be more effective at retrieving records (i.e., data) with outliers than other query statements. Accordingly, each query statement will be used to query the table in order to determine query results, which will be the records and corresponding data elements that match each condition combinations. Based on the data element quantity and/or the record quantity for each query statement, query statements that fall within predetermined upper and lower limits and/or record quantities that fall within other predetermined upper and lower limits may be tagged or otherwise identified as "potential rule(s)". Thereafter, an outlier detection model is applied to the records associated with the potential rule(s), which in some embodiments may include a hyperparameter tuning and/or a grid search technique. The outlier detection model may be a local outlier factor method and/or an isolation forest method. Thereafter, in some embodiments, a network graph is generated and displayed to provide insight and analysis into the records and any outliers.

What is more, the present invention provides a technical solution to a technical problem. As described herein, the technical problem includes inadequate technology to detect outliers in large amounts of data, the current solutions for which result in query statement creation by human involvement and painstaking analysis. The technical solution presented herein allows for the automation and visualization of query statement effectiveness and the resulting outliers that are identified by effective query statements. In particular, the system is an improvement over existing outlier detection systems by creating and implementing query statements (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources.

Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for combinatorial data outlier detection via database query statement generation, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

In some embodiments, system 130 may include one of more quantum computer devices. A quantum computer similarly comprises a quantum processor 102, quantum memory 104, quantum input/output (QI/O) device 116, and a quantum storage device 106. The system 130 also incorporates a high-speed quantum interface 108 to facilitating connections to the quantum memory 104, and a low-speed quantum interface 112 connecting to a low-speed quantum bus 114 and the quantum storage device 106.

Notably, the quantum components 102, 104, 108, 110, and 112 are interconnected through quantum buses that harness quantum entanglement and superposition effects. These quantum interconnections use the properties of quantum states to enable advanced computation and communication through the manipulation of qubits. In this quantum context, the quantum processor 102 encompasses distinct subsystems for executing specific quantum processes and algorithms as described herein. Each quantum computer operates as an autonomous quantum unit within the broader system 130, capable of specialized quantum computations as integral constituents of the overarching quantum architecture.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory engine) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning engine (ML) subsystem architecture 200, in accordance with an embodiment of the invention. The machine learning model 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning engine 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data

218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning engine 224 using the training data 218 to make predictions or decisions without explicitly being programmed to do so. The machine learning engine 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given supplyback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning engine type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), outlier detection method (e.g., local outlier factor ("LOF"), isolation forest, etc.), and/or the like.

In particular, the local outlier factor outlier detection engine may refer to a method designed to identify anomalies within a dataset. LOF calculates the degree to which a data point stands out in terms of its local density compared to its neighbors, enabling it to pinpoint potential outliers. The isolation forest outlier detection engine may refer to another technique tailored for detecting anomalies in datasets. The Isolation Forest method achieves this by isolating individual instances that are notably distinct from the majority of the data points. It accomplishes this isolation through the construction of a random forest of decision trees, where anomalies are characterized by shorter paths in the trees.

To tune the machine learning engine, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning engine 232 is one whose hyperparameters are tuned and model accuracy maximized.

The trained machine learning engine 232, similar to any other software application output, can be persisted to storage, file, memory, or application, or looped back into the processing component to be reprocessed. More often, the trained machine learning engine 232 is deployed into an existing production environment to make practical business decisions based on live data 234. To this end, the machine learning model 200 uses the inference engine 236 to make such decisions. The type of decision-making may depend upon the type of machine learning algorithm used. For example, machine learning engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning engines that perform regression techniques may use live data 234 to predict or forecast continuous outcomes.

It will be understood that the embodiment of the machine learning model 200 illustrated in FIG. 2 is exemplary and that other embodiments may vary. As another example, in some embodiments, the machine learning model 200 may include more, fewer, or different components.

FIGS. 3A-3B illustrate a process flow for combinatorial data outlier detection via database query statement generation, in accordance with an embodiment of the invention. The process may begin at block 302 where the system 130 receives a table from a database. To receive a table from a database, the system 130 may initiate a query or request through a database connection established using appropriate protocols such as Structured Query Language (SQL) or specialized APIs. This query specifies the desired table and any relevant filtering, sorting, or joining conditions. Upon receiving the query, a database management system may processes it and retrieve the requested table along with its associated data from the underlying storage. This data retrieval might involve accessing disk storage or utilizing in-memory caches for optimized performance. In some embodiments, the system 130 may receive a single table. In other embodiments, the system 130 may receive a plurality of tables. In embodiments where a plurality of tables is received, the tables may be stored in a single server or reference data in a single database. Alternatively, a plurality of tables may be stored in multiple servers or reference data in multiple databases.

It will be understood that tables comprise rows and columns. Every row corresponds to an individual "record" or datum, while each column represents a distinct attribute or field associated with that record. A record denotes a singular occurrence of data, where the record includes various data elements, each data element associated with a column that aligns with the corresponding data elements of corresponding records. For example, if data includes global positioning system data for a group of devices, each record includes a longitude value and a latitude value. The latitude values for each record would be within the same column. The longitude values for each record would be within a different column.

The columns dictate the schema or framework of the data, outlining the data type and constraints that must be adhered to by the values within that specific column. In some embodiments, each column includes a heading that may represent the data elements within the corresponding column and align with a specific attribute or property pertaining to the corresponding records with data in said column. A data element may denote a data value located at the intersection of a designated row and its corresponding column. Such data elements are subject to the prescribed data type allocated to that particular column. The array of potential data types encompasses numeric classifications (like integers and decimals), character representations (including strings and text), temporal categorizations, Boolean states, and so forth.

The process may continue at block 304, where the system 130 determines a datatype to be assigned to each data element. It shall be appreciated that every data element within a single column of the table is assumed to be of the same datatype as the other data elements within the same column. Thus, in some embodiments, the system 130 determines a datatype to be assigned to a column and forgoes the assigning of a datatype to each data element.

The process involves employing a machine learning model 200, such as, as one non-limiting example, a neural network, for datatype classification. This model undergoes a training phase using labeled data to learn the characteristics of different datatypes. When classifying a specific data column, the model conducts an in-depth analysis of the data distribution, calculating statistical metrics like mean, variance, and entropy. It then compares these metrics with predefined thresholds for various datatype categories.

Through this quantitative assessment, the model determines the likelihood of the data column belonging to different datatypes. For example, if the mean and variance are within a certain range, it suggests a numerical datatype; if the majority of values are discrete and belong to distinct categories, a categorical datatype is inferred. Additionally, lexical analysis and regular expressions might be applied to identify textual or temporal patterns. Once the model assigns a probability distribution over possible datatypes, it selects the one with the highest confidence as the assigned datatype for the column.

Thus, based on each column and using a machine learning model 200, a datatype is assigned to each data element. In some embodiments the datatype is recorded elsewhere in the table, for example in a header section, while references to the corresponding header section are made within each data element.

The datatype may be numeric, date, or text. For example, for numeric datatypes, the model may assess the distribution, range, and statistical properties of the values within the column, determining if they align with characteristics of integers, floating-point numbers, or other numerical representations. In the case of date datatypes, the model identifies common date formats, recognizes temporal patterns, and validates consistency in date entries. Similarly, for text datatypes, the model examines linguistic features, character distributions, and contextual information to distinguish between categorical text, free-text entries, and other textual formats.

Next, at block 306, the system 130 may generate conditions for columns corresponding to each data element. The conditions are selected by the system 130 based on the datatype determined in block 304 (e.g., whether the datatype is numeric, date, or text). The conditions for the datatype may be selected by the system 130, generally as either null conditions, operator conditions, or possible value conditions.

Referring now to FIG. 4, FIG. 4 illustrates a condition chart for use in determining conditions, in accordance with an embodiment of the invention. Regarding null conditions 402a, for each data element that is numerical 404, date 406, or text 408, a set of null conditions is automatically generated. These conditions check whether the data element contains a null value or is not null. This ensures that missing or incomplete data can be identified and handled appropriately during subsequent processing steps. For example: "Number is null", "Number is not null", "Date is null", "Date is not null", "Text is null", "Text is not null".

Regarding operator conditions 402b, operator conditions are crafted based on the datatype and are particularly useful for numeric 404 and date 406 datatypes. The system 130 generates comparisons between the data element and other data elements within the same column. For numeric datatypes, operators like 'greater than,' 'less than,' and 'equal to' are employed to perform data filtering or transformation. Similarly, for date datatypes, comparisons like 'before,'

'after,' and 'equal to' are utilized to establish temporal relationships. Examples include: "Number 1>=Number 2", "Number 1==Number 2", "Number 1<Number 2", "Date 1>=Date 2", "Date 1==Date 2", and "Date 1<Date 2".

Regarding possible value conditions 402c, when dealing with data elements that have predefined, categorical values, the system 130 generates possible value conditions. These conditions for each data element that is numerical 404, date 406, or text 408 compare the data element's value against a list of permissible and predetermined values. Examples include: "Number==Possible Value", "Number< >Possible Value", "Date==Possible Value", "Date< >Possible Value", "Text==Possible Value", "Text< >Possible Value".

Referring back to FIG. 3A, and continuing at block 308, the system 130 may then combine the conditions into a predetermined number of condition combinations. It shall be appreciated that by using multiple conditions, the system 130 can create intricate and targeted rules for data processing. These condition combinations are formed by logically connecting individual conditions using operators such as AND and OR. This allows for the construction of complex criteria that consider various aspects of the data simultaneously. For instance, if a data element needs to satisfy both a null condition and an operator condition, the system 130 can express this requirement through a combined condition. This capability enables a higher degree of precision and specificity in data manipulation and analysis. Additionally, the predetermined number of condition combinations ensures controlled complexity and controlled use of computing resources during both the generation of the condition combinations as well as the application thereof.

The formation of condition combinations relies on a combinatorial sequencing approach, wherein conditions are systematically combined to generate a set of composite criteria ("condition combinations"). This process involves considering all possible combinations of conditions, respecting the logical operators (AND, OR) that connect them. To illustrate, the following three conditions are given: Condition A (Numeric), Condition B (Date), and Condition C (Text). The system 130 creates combinations that evaluate the interplay of these conditions, respecting the logical operators. For example: Condition A AND Condition B: This combination assesses cases where both numeric and date conditions are met simultaneously, allowing for scenarios like "Number is greater than 10 AND Date is after 2023 Jan. 1." As another example, consider the following condition combination: Condition A OR Condition C: Here, the combination captures cases where either the numeric condition or the text condition holds true. An example could be "Number is less than 5 OR Text contains 'important'." As another example, consider the following condition combination: Condition B AND Condition C: This combination considers situations where both date and text conditions align. For instance, "Date is before 2023 Dec. 31 AND Text starts with 'ABC'." As yet another example, consider the following condition combination: Condition A AND Condition B AND Condition C: This combination evaluates all three conditions concurrently, leading to criteria such as "Number is equal to 7 AND Date is not null AND Text is 'example'."

Referring now to FIG. 5, which illustrates the determination of condition combinations, in accordance with an embodiment of the invention, an exemplary sequence of condition combinations is shown. For a one-condition sequences of a condition combination, only Condition A 502 may be applied. However, for two-condition sequences, Condition A 502 may be combined with Condition B 504 via and AND operator and an OR operator, formulating two condition combinations. Further, for three-condition sequences, the condition combination of (Condition A 502 AND Condition B 504) and (Condition A 502 OR Condition B 504) may each be further combined with Condition C 506 via the AND and the OR operators. Such combination yields four condition combinations.

As shall be appreciated in view of the disclosure herein, the growth rate of the number of condition combinations is such that the number of condition combinations increases exponentially with the addition of additional conditions. Accordingly, in some embodiments, it may be necessary for the system 130 to incorporate a quantum computer to generate the combined conditions in an acceptably short timeframe. While it is feasible for such computations to occur using a classical computer, the processing speed may be suboptimal.

In some embodiments, the quantum computer may be incorporated into the system 130 to perform any or all of the steps represented herein in FIGS. 3A and 3B as blocks 302 through 324. In other embodiments, the quantum computer may be incorporated into the system 130 only for the steps illustrated at block 306 through block 314.

Referring back to FIG. 3A, at block 310 the system 130 generates a query statement for each of the condition combinations. The query statement is generally written as a Structured Query Language ("SQL") statement. To generate the query statement from the condition combinations, the system 130 employs a procedural approach that involves translating the logical conditions into SQL syntax.

Beginning with the logical conditions from the combinations, the system 130 maps each condition's elements (e.g., column names, operators, values) to their corresponding SQL representations. For example, a condition like "Number is greater than 10" is translated to "Number>10" in SQL syntax. Similarly, a condition like "Date is after 2023 Jan. 1" is transformed into "Date> '2023 Jan. 1'."

The logical operators (AND, OR) that link conditions are also converted to their SQL equivalents. An AND operator translates directly, while an OR operator is represented as "OR" in SQL syntax. These operators serve to combine individual conditions within the query statement. After mapping each condition and operator, the system 130 assembles them into a complete SQL query statement. For instance, a condition combination of "Number>10 AND Date>'2023 Jan. 1'" becomes the SQL query: "SELECT*FROM table WHERE Number>10 AND Date>'2023 Jan. 1'." This generated SQL query statement encapsulates the criteria defined by the condition combinations.

Referring now to FIG. 3B, the system 130 at block 312 may then query the table with each query statement to determine query results. In other words, the query statement is executed against the database, retrieving data that satisfies the conditions. The query results are the results that match at least one of the condition combinations (e.g., the query statement), with such retrieved query results corresponding to the rows in the database table that fulfill the criteria set forth by the condition combinations.

As the system 130 processes each query statement, it triggers a sequence of actions within the database management system 130. This sequence involves comparing the conditions specified within the query statement to the data stored in the database table. Upon executing the query statement, the database system 130 scans through the rows of the table, assessing whether each row's data aligns with the conditions stipulated in the query. Data that satisfies at least one of the condition combinations are considered relevant to the query and are designated as query results.

Next, at block 314, in some embodiments, the system 130 may determine for each query statement a data element quantity in the query results. For each query statement, the system 130 calculates the quantity of data elements present in the query results. This involves counting the number of individual data elements that meet the criteria of the query. Additionally, or alternatively, in some embodiments, the system 130 may determine a record quantity corresponding to each data element in the query results. A record quantity signifies how many times each data element is repeated or associated with different records in the results. This step involves analyzing the relationships between data elements and the records they are a part of.

Continuing at block 316, the system 130 may then subsequently tag the query statement as a potential rule if the data element quantity in the query results is within a first predetermined upper and lower limit. For example, in some embodiments, the system 130 may be provided with predetermined upper limit of 500 data elements and a lower limit of 100 data elements. Thus, query statements that return between 100 and 500 data elements would be flagged as a potential rule. In some embodiments, only a predetermined upper limit may be provided, such that no predetermined lower limit may be necessary. In other embodiments, only a predetermined lower limit may be provided, such that no predetermined upper limit may be necessary.

The number of data elements may be based on a predetermined column or a group of predetermined columns, and the number of data elements being calculated as a sum of the data elements within the predetermined column(s). The predetermined column, or a group of predetermined columns, may be predetermined based on the contents of the query statement itself.

Additionally, or alternatively, a potential rule tag may be applied if the record quantity corresponding to the data elements in the query results is within a second predetermined upper and lower limit. In this alternative approach, the system 130 examines the calculated record quantities associated with each column. These record quantities represents the quantity of different records within the query results for a predetermined column. In other words, the number of rows in the database for a predetermined column or a group of predetermined columns represents a record quantity. If these record quantities fall within a predefined range, the system 130 tags the query statement as a potential rule.

For example, in some embodiments, the system 130 may be provided with predetermined upper limit of 50 records and a lower limit of 10 records. Thus, query statements that return between 10 and 50 records would be flagged as a potential rule. In some embodiments, only a predetermined upper limit may be provided, such that no predetermined lower limit may be necessary. In other embodiments, only a predetermined lower limit may be provided, such that no predetermined upper limit may be necessary.

In yet still additional embodiments, the predetermined upper and lower limits may be provided as a percentage. As the system 130 retrieves records that meet the query statement, the number of such records may be presented as a percentage of the overall number of records within a column of the table. It shall be appreciated that not all records have some data elements, and as such the overall number of records may be the number of records of the longest column (e.g., the column with the highest quantity of data records) from the results of the query statement.

In some embodiments, the query statements tagged as potential rules may be aggregated into a table of a database for communication and presentation of the potential rules to a user associated with the entity via an interface of an endpoint device 140. An exemplary table is provided herein at FIG. 6.

Referring now to FIG. 6, which illustrates an exemplary querying with query statements to determine query results, in accordance with an embodiment of the invention, the upper and lower limits 604 are input into the system 130, or otherwise predetermined. Here, the lower limit is presented as a percentage of 0%, while the upper limit is presented as 1.00%. Query statements 602a through 602f are each executed against the table in the database, which leads to a quantity of returned records 606. The returned records 608 is also expressed as a percentage of records returned 608, calculated as a percentage of the returned records 606 of the overall number of records as previously described.

Returning to FIG. 3B, at block 318 the system 130 may apply an outlier detection model to the records corresponding to the potential rule. In some embodiments, the outlier detection model includes at least one selected from the group consisting of: a local outlier factor method and an isolation forest method. The system 130 retrieves the individual records for each of the query statements tagged as potential rules. To do so, the system 130 uses the metadata and identifiers associated with the potential rule and accesses the relevant database tables or data sources to extract the records that pertain to each query statement. These records collectively represent instances of data considered for the potential rule.

In some embodiments, the outlier detection model may implement a local outlier factor method. Additionally, or alternatively, the outlier detection model may implement an isolation forest method.

In some embodiments where both the isolation forest method and the local outlier factor method are used, the isolation forest method is implemented first, followed by the local outlier factor method. In other embodiments, where both the isolation forest method and the local outlier factor method are used, the local outlier factor method is implemented first, followed by the isolation forest method. In yet additional embodiments, both the isolation forest method and the local outlier factor method may be used simultaneously.

Regardless of the order of execution of the outlier detection model(s), the outlier detection model(s) extracts the data elements of the potential rule(s). If a plurality of columns are retrieved by the outlier detection model, the outlier detection model(s) may analyze the data (as will be in discussed in block 320) in a per-column approach, such as to only analyze contents of a single column and determine outliers therein. Accordingly, metadata may be required to be applied to the data to relate the datapoints to the row and column of the table from which it came. In this way, after the analysis of the records where outliers are determined, the outliers in a set of data elements can be traced back to their corresponding records to provide every data element that makes up the records identified to contain one or more outliers. The metadata may include additional information about the data itself, such as its source location, meaning, data type, units, and so forth.

Next, at block 320, the outlier detection algorithmic portion(s) of the outlier detection model(s) is executed. Accordingly, the outlier detection model(s) identify, outliers in the records. For example, Record A may contain a Data Element X that falls within Column I, where Data Element X has a value of 10. Record B may contain a Data Element Y that falls within Column I, where Data Element Y has a value of 11. Record C may contain a Data Element Z that falls within Column I, where Data Element Z has a value of 400. In such an example, the objective of the outlier detection model(s) is to identify either Data Element Z as an outlier, or Record C as the outlier, since Record C is the corresponding record containing Data Element Z.

Outliers may be detected based on proximity to clusters generated by the outlier detection model. Clusters are generated by the outlier detection model(s) using their respective methodologies described herein. Once the clusters are generated, the distance between each data element and the center of its assigned cluster is measured. A predetermined distance is considered to be a threshold between a data element that is an outlier and a data element that is not an outlier.

In some embodiments, the system 130 may apply a grid search technique including hyperparameter tuning to the outlier detection model. In doing so, the set of hyperparameters that yield the best performance of the outlier detection model(s) may be identified. First, the hyperparameters to be tuned are predetermined (i.e., selected), and a range of possible values for each hyperparameter is also predetermined.

In some embodiments where an isolation forest model is implemented, the number of isolation trees, the number of samples to draw to create each isolation tree, the expected proportion of outliers in the data, and other hyperparameters may be selected.

In other embodiments where a local outlier method is implemented, hyperparameters may be selected, such as the number of neighbors for local density calculations (i.e., "n_neighbors"), the specific algorithm used for identifying nearest neighbors (such as "ball_tree", "kd_tree", or "brute"), the leaf size for build time, distance metrics such as Euclidean distance or Manhattan distance (generalized as the Minkowski distance), and so forth.

Then, a grid is created by combining all possible values of each hyperparameter, resulting in a set of hyperparameter combinations. To evaluate the performance of each hyperparameter combination, metrics including, but not limited to, precision, recall, or F1-score may be implemented. The chosen metric may be monitored as the grid search is performed. To perform the grid search, a nested loop is used to iterate through all hyperparameter combinations in the grid, with the isolation forest or local outlier method created at each iteration and applied to the data elements. In some embodiments, a preselected subset of data elements is implemented for this iterative testing, where the preselected subset is smaller than the overall dataset. Then, by selecting hyperparameters that maximize or minimize an evaluation metric (as will be predetermined), hyperparameters are selected for implementation across the broader dataset of data elements. In this way, detection of outliers using the isolation forest method may be improved for accuracy to avoid the false detection of outliers.

Importantly, in some embodiments, the process flow illustrated in FIG. 3A requires a lengthy time of computation to generation the condition combinations and prepare all of the query statements. Thus, in such embodiments, each time a single query statement or a predetermined batch size of query statements is generated from the process of FIG. 3A (e.g., the output of block 310), this single query statement or predetermined batch of query statements may be provided to the process in FIG. 3B (e.g., the input of block 312) to initiate such process prior to the generation of the entirety of the query statements. In other words, both processes may be simultaneously executed in parallel with one other, where there is a constant but steady influx of query statements into block 312.

What's more, when quantum algorithms such as those described herein are executed, operations are performed on qubits that can represent all possible combinations of states simultaneously. This parallelism in combination with the quantum computing leads to an exponential speedup in generation of a large number of query statements and the searching of databases for data that meets the requirements of these query statements.

Continuing at block 322, in some embodiments the system 130 may generate a plot that includes a graph network of the records corresponding to the potential rule. As shall be understood based on the foregoing, records associated with outliers of data have been identified. However, to fully understand the nature of the outlier(s), other data that may be impacted by systemic irregularities that present themselves as the outlier(s), and the interconnectivities of various records, a graphical representation of these records may be beneficial for visual analysis and investigation.

First, a library that provides graph data structures may be selected. The data records may be transformed via preprocessing in order to prepare for data representation in the graph network. Such preprocessing may include the identification and removal of duplicates, aggregating the data, normalizing and/or scaling the node and edge attributes such that they each fall within a predetermined range, and dimensionality reduction such as Principal Component Analysis.

Referring now to FIG. 7, which illustrates an exemplary graph network 700, in accordance with an embodiment of the invention, each data record will be represented as a node 704, and relationships between data records will be represented as edges 706 connecting each node.

A layout algorithm may be applied to the nodes to arrange the nodes in a more intuitive manner, such as grouping based on physical location indicated in the data record, data size, throughput, and so forth. Individual groups of nodes, such as a first group 702a and as second group 702b, may be displayed in predetermined portions of the graph network such as to aid in visualization of node interaction and interactivity.

Interactivity within the graph network may be provided, such as to allow a user at an endpoint device 140 to select an individual node or group of nodes, and receive a display of the underlying data record(s) associated with the node(s).

Referring back to FIG. 3B, at block 324 the system 130 may transmit the plot to an endpoint device 140 for display of the plot on an interface of the endpoint device 140. By displaying the graph network on an interface such as a graphical user interface, users associated with the entity may be provided the ability to interact with the data elements, and subsequently observe the effectiveness of the query statement(s) or evaluate the quality and nature of the data elements.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for combinatorial data outlier detection via database query statement generation, the system comprising:
 a processing device; and
 a non-transitory storage device comprising instructions configured to control the processing device to:
  receive a table comprising rows and columns, wherein each column comprises records and a corresponding data element;
  determine, based on each column and using a first machine learning model, a datatype to be assigned to each data element, wherein the datatype is selected from a list consisting of numeric, date, and text;

generate conditions for columns corresponding to each data element, wherein conditions are selected based on the datatype of a corresponding column, and wherein conditions are selected from a group consisting of null conditions, operator conditions, and value conditions, wherein the null conditions determine whether the data element contains a null value or not, wherein the operator conditions comprise comparisons between data elements within the same column, and wherein the value conditions comprise equality or inequality comparisons between a data element and a predefined set of permissible values;

combine more than two of the conditions into a predetermined number of condition combinations, each condition combination comprising a combinatorial sequencing of the conditions having logical operators (AND, OR) between each condition such that the predetermined number of condition combinations comprises all possible logical arrangements of the conditions, and wherein the predetermined number of condition combinations increases exponentially with each increase in number of conditions;

generate a query statement for each of the condition combinations;

query, in parallel with combining the conditions into the predetermined number of condition combinations, the table with each query statement to determine query results, wherein the query results match at least one of the condition combinations;

determine, for each query statement, a data element quantity in the query results and a record quantity corresponding to each data element in the query results;

tag the query statement as a rule in response to the data element quantity in the query results being within a first predetermined upper and lower limit, and the record quantity corresponding to each data element in the query results being within a second predetermined upper and lower limit, wherein the second predetermined upper and lower limit comprises thresholds expressed as percentages of total number of records within a column;

extract records corresponding to the rule by using metadata associated with the rule to retrieve the records corresponding to the rule from the table;

apply an outlier detection model to the records corresponding to the rule; and identify, using the outlier detection model, outliers in the records, wherein the outliers are detected based on proximity to clusters generated by the outlier detection model.

2. The system of claim 1, wherein the instructions are further configured to control the processing device to:
generate a plot comprising a graph network of the records corresponding to the rule; and
transmit the plot to an endpoint device for displaying on an interface of the endpoint device.

3. The system of claim 1, wherein the instructions are further configured to control the processing device to:
generate a plot comprising a graph network of the records corresponding to the outliers in the records; and
transmit the plot to an endpoint device for displaying on an interface of the endpoint device.

4. The system of claim 1, wherein the instructions are further configured to control the processing device to:
apply a grid search technique comprising hyperparameter tuning to the outlier detection model.

5. The system of claim 1, wherein the outlier detection model comprises at least one selected from the group consisting of: a local outlier factor method and an isolation forest method.

6. The system of claim 1, wherein the outlier detection model comprises a local outlier factor method and an isolation forest method.

7. The system of claim 1, wherein a quantum computer combines the more than two of the conditions into the predetermined number of condition combinations such that a timeframe of combining is shorter than that of a classical computing system.

8. A computer program product for combinatorial data outlier detection via database query statement generation, the computer program product comprising a non-transitory computer-readable medium comprising code configured to control a processing device to:

receive a table comprising rows and columns, wherein each column comprises records and a corresponding data element;

determine, based on each column and using a first machine learning model, a datatype to be assigned to each data element, wherein the datatype is selected from a list consisting of numeric, date, and text;

generate conditions for columns corresponding to each data element, wherein conditions are selected based on the datatype of a corresponding column, and wherein conditions are selected from a group consisting of null conditions, operator conditions, and value conditions, wherein the null conditions determine whether the data element contains a null value or not, wherein the operator conditions comprise comparisons between data elements within the same column, and wherein the value conditions comprise equality or inequality comparisons between a data element and a predefined set of permissible values;

combine more than two of the conditions into a predetermined number of condition combinations, each condition combination comprising a combinatorial sequencing of the conditions having logical operators (AND, OR) between each condition such that the predetermined number of condition combinations comprises all possible logical arrangements of the conditions, and wherein the predetermined number of condition combinations increases exponentially with each increase in number of conditions;

generate a query statement for each of the condition combinations;

query, in parallel with combining the conditions into the predetermined number of condition combinations, the table with each query statement to determine query results, wherein the query results match at least one of the condition combinations;

determine, for each query statement, a data element quantity in the query results and a record quantity corresponding to each data element in the query results;

tag the query statement as a rule in response to the data element quantity in the query results being within a first predetermined upper and lower limit, and the record quantity corresponding to each data element in the query results being within a second predetermined upper and lower limit, wherein the second predetermined upper and lower limit comprises thresholds expressed as percentages of total number of records within a column;

extract records corresponding to the rule by using metadata associated with the rule to retrieve the records corresponding to the rule from the table;
apply an outlier detection model to the records corresponding to the rule; and
identify, using the outlier detection model, outliers in the records, wherein the outliers are detected based on proximity to clusters generated by the outlier detection model.

9. The computer program product of claim 8, wherein the code is further configured to control the processing device to:
generate a plot comprising a graph network of the records corresponding to the rule; and
transmit the plot to an endpoint device for displaying on an interface of the endpoint device.

10. The computer program product of claim 8, wherein the code is further configured to control the processing device to:
generate a plot comprising a graph network of the records corresponding to the outliers in the records; and
transmit the plot to an endpoint device for displaying on an interface of the endpoint device.

11. The computer program product of claim 8, wherein the code is further configured to control the processing device to:
apply a grid search technique comprising hyperparameter tuning to the outlier detection model.

12. The computer program product of claim 8, wherein the outlier detection model comprises at least one selected from the group consisting of: a local outlier factor method and an isolation forest method.

13. The computer program product of claim 8, wherein the outlier detection model comprises a local outlier factor method and an isolation forest method.

14. The computer program product of claim 8, wherein a quantum computer combines the more than two of the conditions into the predetermined number of condition combinations such that a timeframe of combining is shorter than that of a classical computing system.

15. A computer-implemented method for combinatorial data outlier detection via database query statement generation, the method comprising:
receiving a table comprising rows and columns, wherein each column comprises records and a corresponding data element;
determining, based on each column and using a first machine learning model, a datatype to be assigned to each data element, wherein the datatype is selected from a list consisting of numeric, date, and text;
generating conditions for columns corresponding to each data element, wherein conditions are selected based on the datatype of a corresponding column, and wherein conditions are selected from a group consisting of null conditions, operator conditions, and value conditions, wherein the null conditions determine whether the data element contains a null value or not, wherein the operator conditions comprise comparisons between data elements within the same column, and wherein the value conditions comprise equality or inequality comparisons between a data element and a predefined set of permissible values;
combining more than two of the conditions into a predetermined number of condition combinations, each condition combination comprising a combinatorial sequencing of the conditions having logical operators (AND, OR) between each condition such that the predetermined number of condition combinations comprises all possible logical arrangements of the conditions, and wherein the predetermined number of condition combinations increases exponentially with each increase in number of conditions;
generating a query statement for each of the condition combinations;
querying, in parallel with combining the conditions into the predetermined number of condition combinations, the table with each query statement to determine query results, wherein the query results match at least one of the condition combinations;
determining, for each query statement, a data element quantity in the query results and a record quantity corresponding to each data element in the query results;
tag the query statement as a rule in response to the data element quantity in the query results being within a first predetermined upper and lower limit, and the record quantity corresponding to each data element in the query results being within a second predetermined upper and lower limit, wherein the second predetermined upper and lower limit comprises thresholds expressed as percentages of total number of records within a column;
extract records corresponding to the rule by using metadata associated with the rule to retrieve the records corresponding to the rule from the table;
apply an outlier detection model to the records corresponding to the rule; and
identify, using the outlier detection model, outliers in the records, wherein the outliers are detected based on proximity to clusters generated by the outlier detection model.

16. The computer-implemented method of claim 15, wherein the method further comprises:
generating a plot comprising a graph network of the records corresponding to the rule; and
transmitting the plot to an endpoint device for displaying on an interface of the endpoint device.

17. The computer-implemented method of claim 15, wherein the method further comprises:
applying a grid search technique comprising hyperparameter tuning to the outlier detection model.

18. The computer-implemented method of claim 15, wherein the outlier detection model comprises at least one selected from the group consisting of: a local outlier factor method and an isolation forest method.

19. The computer-implemented method of claim 15, wherein the outlier detection model comprises a local outlier factor method and an isolation forest method.

20. The computer-implemented method of claim 15, wherein a quantum computer combines the more than two of the conditions into the predetermined number of condition combinations such that a timeframe of combining is shorter than that of a classical computing system.

* * * * *